(12) United States Patent
Higaki

(10) Patent No.: US 8,570,399 B2
(45) Date of Patent: Oct. 29, 2013

(54) IMAGING APPARATUS

(71) Applicant: Nikon Corporation, Tokyo (JP)

(72) Inventor: Riichi Higaki, Matsudo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/692,508

(22) Filed: Dec. 3, 2012

(65) Prior Publication Data

US 2013/0194452 A1 Aug. 1, 2013

Related U.S. Application Data

(63) Continuation of application No. 13/025,924, filed on Feb. 11, 2011, now abandoned, which is a continuation of application No. PCT/JP2009/064728, filed on Aug. 24, 2009.

(30) Foreign Application Priority Data

Sep. 12, 2008 (JP) .................................. 2008-234233

(51) Int. Cl.
*H04N 5/76* (2006.01)
*H04W 24/00* (2009.01)

(52) U.S. Cl.
USPC ..................................... 348/231.2; 455/456.1

(58) Field of Classification Search
USPC .......................... 348/231.2, 158, 148, 231.99, 348/333.01–333.06; 342/357.22; 455/456.3, 456.1
See application file for complete search history.

(56) References Cited

U.S. PATENT DOCUMENTS

| | | | |
|---|---|---|---|
| 6,995,792 B1 * | 2/2006 | Ogura ....................... | 348/231.99 |
| 7,912,366 B2 * | 3/2011 | Huliyapur Math ........... | 396/296 |
| 8,305,479 B2 * | 11/2012 | Park .......................... | 348/333.13 |
| 2007/0263981 A1 * | 11/2007 | Ueno et al. ...................... | 386/83 |
| 2012/0223860 A1 * | 9/2012 | Leclercq .................. | 342/357.63 |

FOREIGN PATENT DOCUMENTS

| | | |
|---|---|---|
| JP | A-10-282208 | 10/1998 |
| JP | A-2000-056386 | 2/2000 |
| JP | 2006-154278 A | 6/2006 |
| JP | 2007-158887 A | 6/2007 |
| JP | A-2007-295034 | 11/2007 |
| JP | A-2002-071376 | 3/2012 |

OTHER PUBLICATIONS

Mar. 15, 2011 International Preliminary Report on Patentability issued in PCT/JP2009/064728 (with translation).

(Continued)

*Primary Examiner* — Aung S Moe
*Assistant Examiner* — Mekonnen Dagnew
(74) *Attorney, Agent, or Firm* — Oliff & Berridge, PLC

(57) ABSTRACT

An imaging apparatus is provided with: an imaging unit including an imaging sensor for imaging light from an object and a storage unit for storing image data generated based on an imaging signal output from the imaging sensor; and a GPS module. The GPS module is used for executing a process of calculating location information based on received data from a satellite. The GPS module shifts from the low power consumption mode or the power OFF state to a normal operation mode in which the process of calculating the location information is executed as a result of the imaging unit shifting from a low power consumption mode or a power OFF state to a normal image-capture mode.

10 Claims, 8 Drawing Sheets

(56) References Cited

OTHER PUBLICATIONS

International Search Report in International Application No. PCT/JP2009/064728; dated Sep. 15, 2009 (with English-language translation).

Jul. 2, 2012 Office Action against U.S. Appl. No. 13/025,924.
Oct. 2, 2012 Office Action issued in Japanese Patent Application No. 2010-528700 (with translation).

* cited by examiner

IMAGING APPARATUS

CROSS-REFERENCE TO RELATED APPLICATIONS

This application is a Continuation Application No. of U.S. patent application Ser. No. 13/025,924 filed on Feb. 11, 2011, which is a National Stage Application of Application No. PCT/JP2009/064728 filed on Aug. 24, 2009.

The disclosure of the following priority application is herein incorporated by reference:

Japanese Patent Application No. 2008-234233 filed on Sep. 12, 2008.

BACKGROUND

1. Technical Field

The present invention relates to an imaging apparatus for adding location information to an image.

2. Background Art

In recent years, there is disclosed a camera which is equipped with a GPS receiver for receiving radio waves from a GPS (Global Positioning System) satellite, in which location information (longitude, latitude, altitude, time and the like) calculated based on the radio waves received by the GPS receiver from the GPS satellite is added to the image data of the captured image, and the resultant image data is stored (for example, see Patent Literature 1). The GPS receiver equipped in the camera receives the radio waves from the GPS satellite at each predetermined time.

CITATION LIST

Patent Literature

Patent Literature 1: Japanese Patent Application Publication No. 2000-56386.

SUMMARY

Technical Problem

In a camera using a battery as the source of power supply, a large amount of power is required when the GPS receiver is continuously operated using the camera battery as the source of power supply in order to receive radio waves from the GPS satellite at each predetermined time, and therefore, the battery life is shortened.

Furthermore, there is a problem that when the power supply to the GPS receiver is stopped at times other than image capture and power supply to the GPS receiver is started during image capture in order to suppress the consumption of power, some time is required for the GPS receiver to capture the radio waves from the GPS satellite, and therefore, if image capture is prioritized, the location information is not added to the image data, and if the capturing of radio waves is prioritized, the image-capture timing is missed. It is noted that the time required by the GPS receiver to capture radio waves from the GPS satellite is generally 30 seconds or more when the past history is not retained in the camera (startup from power OFF: Cold start), and approximately five seconds when the past history is retained in the camera (startup from the low power consumption mode, which is the minimum required power consumption: Hot start).

An object of the present invention is to provide an imaging apparatus capable of precisely adding location information to image data without missing an image-capture timing.

Solution to Problem

An imaging apparatus of the present invention is an imaging apparatus provided with: an imaging unit including an imaging sensor for imaging light from an object and a storage unit for storing image data generated based on an imaging signal output from the imaging sensor; and a GPS module for executing a process of calculating location information based on received data from a satellite, in which as a result of the imaging unit shifting from a low power consumption mode or a power OFF state to a normal image-capture mode, the GPS module shifts from the low power consumption mode or the power OFF state to a normal operation mode in which the process of calculating the location information is executed, and if it is not possible to perform the process of calculating the location information at the time of imaging the light from an object in the GPS module at a time point at which the light from an object is imaged after the imaging unit has been shifted to the normal image-capture mode, then imaging-time location information obtained in consideration of at least one of pre-image-capture location information already acquired at a time point before the time of imaging and post-image-capture location information calculated at a time point after the time of imaging is added to the image data and stored in the storage unit, and calculation technique information indicating in which technique the image-capture-time location information has been obtained is also added to the image data and stored in the storage unit.

It is noted that the low power consumption mode is a state where a normal image-capture mode or a normal operation mode is shifted to a state where the minimum required power consumption is achieved when a state in which an operation such as image capture is not performed in the imaging apparatus or a state in which no signal is input from an external device such as a cable release continues for a predetermined time or longer set beforehand. Furthermore, the normal image-capture mode is a state where an operation such as image capture can be performed promptly in the imaging apparatus, and the normal operation mode is a state where the satellite is captured by the GPS module and a process of calculating the location information is performed based on the data received from the satellite. The returning from the low power consumption mode to the normal image-capture mode and normal operation mode is executed when a release button is pressed, for example.

Advantageous Effects of Invention

According to an imaging apparatus of the present invention, as a result of the imaging unit shifting from a low power consumption mode or a power OFF state to a normal image-capture mode, the GPS module shifts, in conjunction with the imaging unit, from the low power consumption mode or the power OFF state to a normal operation mode in which a process of calculating location information is executed. In other words, because a power supply unit of the GPS module operates in conjunction with a power supply unit of the imaging unit, the GPS module also is switched to a low power consumption mode when the imaging unit is switched to the low power consumption mode. Thus, the power consumption of the imaging apparatus can be suppressed.

Furthermore, when the imaging unit images the light from an object, even if the process of calculating location information at the time of imaging the light from an object cannot be performed in the GPS module, image data to which imaging-time location information that is based on at least one of location information already calculated before imaging light from an object and location information to be calculated after imaging the light from an object is added is stored in the storage unit. That is, the location information calculated by the GPS module on a date and time closest to a date and time of the imaging time is added. Furthermore, if the location information calculated by the GPS module within a predetermined time from the imaging time is not available, then location information that is estimated based on time information obtained at the imaging time, at least two location information items calculated either before or after imaging the light from an object in the GPS module, and time information obtained when each of the location information is calculated, is added. Therefore, the location information obtained at the time of imaging can be added precisely to the image data without missing the image-capture timing.

DETAILED DESCRIPTION OF THE EMBODIMENTS

Description of Embodiments

Figure 1:
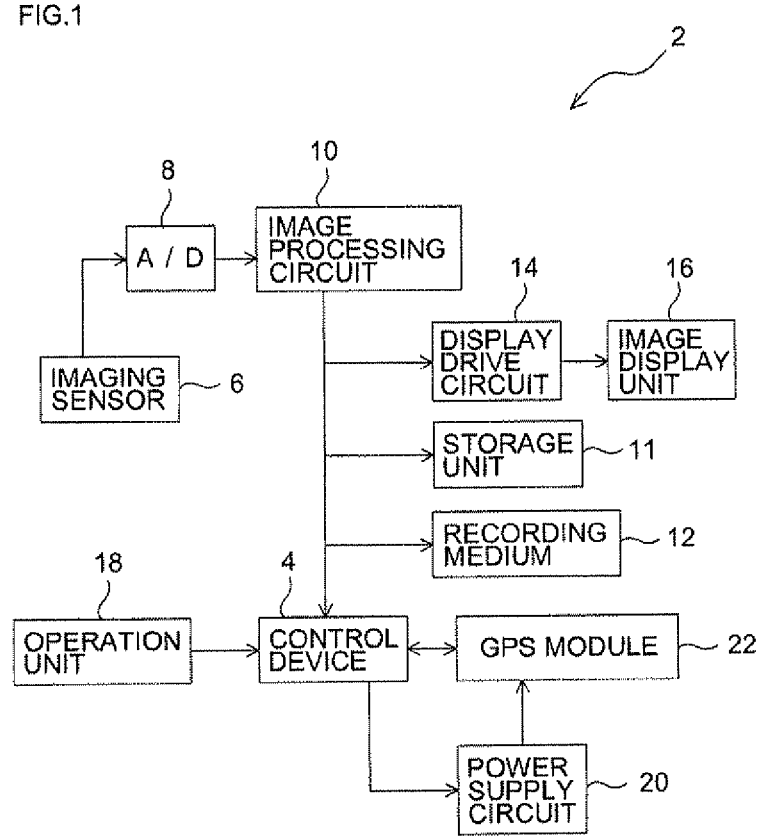
FIG. 1 is a block diagram illustrating a schematic configuration of an electronic camera according to a first embodiment.

Hereinafter, an electronic camera (imaging apparatus) according to a first embodiment of the present invention will be explained with reference to drawings. FIG. 1 is a block diagram illustrating a schematic configuration of an electronic camera 2 according to the first embodiment. The camera is a single-lens reflex electronic camera. However, the present invention is applicable not only to single-lens reflex electronic cameras, but also to compact digital cameras and other electronic cameras. Furthermore, the present invention is not restricted only to devices generally referred to as cameras, but is also applicable to electronic devices equipped with an imaging (image-capture) function.

As illustrated in FIG. 1, the electronic camera 2 is equipped with a control device 4 configured by a microprocessor and the like. By reading and executing a control program from a memory (not illustrated), the control device 4 performs an integrated control of each unit of the electronic camera 2, and at the same time, adds location information transmitted from a GPS module 22, described later, to image data.

An imaging sensor 6 is constituted by a CCD, CMOS, and the like, and outputs an imaging signal (analog signal as an accumulated charge), which is obtained by imaging light from an object passing through a photographic lens (not illustrated), to an A/D converter circuit 8. The imaging signal output from the imaging sensor 6 is converted to a digital signal from the analog signal after the execution of a gain adjustment process and the like in the A/D converter circuit 8, and is transmitted to the image processing circuit 10.

An image processing circuit 10 performs an image process such as white balance adjustment, sharpness adjustment, gamma correction, and gray level adjustment on the image data of the digital signal output from the A/D converter circuit 8. Furthermore, the image processing circuit 10 performs a compression process and the like, if necessary, for compressing to comply with a predetermined compression format. The image data on which the image process has been executed is temporarily stored in a storage unit 11 in a predetermined format such as Exif (Exchangeable image file format) along with an image-capture date and time (date and time information output from a timer device built in the electronic camera 2), exposure, shutter second time, and other information relating to image capture.

A recording medium (storage unit) 12 possesses the portability to be detachably mounted to a card slot (not illustrated) provided in the electronic camera 2, and examples of the recording medium 12 may include a CF card, an SD card, and smart media. In the recording medium 12, the image data which is read from the storage unit 11 by the control unit 4 and to which the imaging-time location information is added is recorded.

A display drive circuit 14 is a circuit for driving an image display unit 16 under the control of the control device 4. On the image display unit 16, an image recorded in the recording medium 12 or a live view image (through image) that is a real time image from the imaging sensor 6 can be displayed. On the image display unit 16, image-capture information and information relating to an operation performed by an operation unit 18 described later, such as a menu (selection item) can also be displayed. Here, the image-capture information includes an image-capture condition (for example, a value of shutter second time and an aperture value).

The operation unit 18 is configured by various switches, buttons, dials, and keys provided at the top or back of a main body of the electronic camera 2, for manually inputting an instruction by a user. Specifically, a power supply dial for switching ON/OFF a power supply, a release button for instructing image capture or the like, a menu button for displaying a menu or the like on the image display unit 16, a cross key for selecting the menu item or the like and for moving a cursor or the like, and a deciding button (OK button) are provided. It is noted that the imaging sensor 6, the A/D converter circuit 8, the image processing circuit 10, the storage unit 11, the recording medium 12, the display drive circuit 14, the image display unit 16, and the operation unit 18 configure the imaging unit of the electronic camera 2.

The power supply circuit 20 supplies power to each unit (each configuration that requires power, including the control device 4) configuring the electronic camera 2 under the control of the control device 4. Furthermore, the power supply circuit 20 selectively switches between a low power consumption mode and a normal image-capture mode, described later, under the control of the control device 4.

The GPS module 22 receives a radio signal from a plurality of GPS satellites orbiting the globe, and performs a process of calculating the location information including a latitude, a longitude, an altitude, and a time relating to a current location of the GPS module 22, based on a trajectory and time data (received data) of the GPS satellite included in the received radio signal. The GPS module 22 of this embodiment is an external device electrically connectable to the electronic camera 2, and although the GPS module 22 is configured to be detachable to the electronic camera 2, the GPS module 22 of the present invention can also be configured to be built inside the electronic camera 2. While the GPS module 22 is connected to the electronic camera 2, the power supply circuit 20 supplies power to the GPS module 22 under the control of the control device 4 configuring the electronic camera 2. Furthermore, during the normal operation mode described later, the GPS module 22 performs the process of calculating the location information at each predetermined timing set beforehand.

The control device 4 operates in association with the power supply circuit 20 and the operation unit 18 to shift from the normal image-capture mode to the low power consumption mode, and from the low power consumption mode to the normal image-capture mode. That is, in the normal image-capture mode, which is a power consumption state in which an operation such as image capture can be performed promptly, the control device 4 outputs to the power supply circuit 20 a control signal instructing transition to the lower power consumption mode that requires less power consumption than the normal image-capture mode, i.e., a minimum required power consumption state, when no operation signal is received from the operation unit 18 for a predetermined time or longer set beforehand. The power supply circuit 20 switches from the normal image-capture mode to the low power consumption mode in accordance with the control signal output from the control device 4.

On the other hand, if any operation signal is received from the operation unit 18 (for example, when the release button is pressed) in the low power consumption mode, the control device 4 outputs a control signal instructing transition from the low power consumption mode to the normal image-capture mode, to the power supply circuit 20. The power supply circuit 20 switches from the low power consumption mode to the normal image-capture mode in accordance with the control signal output from the control device 4.

The power is supplied to the GPS module 22 by the power supply circuit 20 in conjunction with the power supply to each unit of the electronic camera 2 according to the control signals from the control device 4. That is, in conjunction with the power supply to each unit of the electronic camera 2 being switched from the low power consumption mode to the normal image-capture mode and from the normal image-capture mode to the low power consumption mode, the power supply to the GPS module 22 also switches from the low power consumption mode to the normal operation mode and from the normal operation mode to the low power consumption mode. The GPS module 22 receives the radio signal from the GPS satellite only during the normal operation mode, and does not receive the radio signal from the GPS satellite during the low power consumption mode. It is noted that when the power supply state is switched from the power OFF to the power ON, the electronic camera 2 shifts to the normal image-capture mode and the power supply circuit 20 starts supplying power to each unit of the electronic camera 2. Also, at this time, the power supply circuit 20 starts supplying power to the GPS module 22 in order to operate the GPS module 22 in the normal operation mode.

Figure 2:
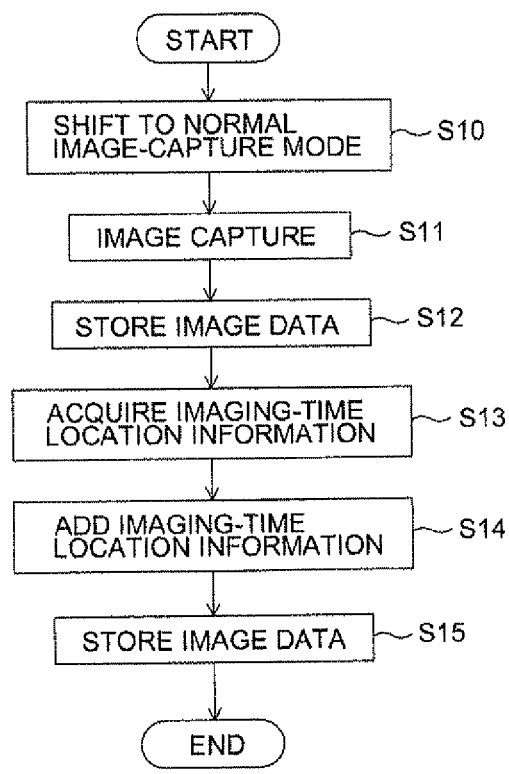
FIG. 2 is a flowchart explaining a process for adding imaging-time location information that is based on location information acquired from a GPS module in the electronic camera according to the first embodiment, to image data.

Next, a process for adding the imaging-time location information to the image data at the time of imaging in the electronic camera 2 according to the first embodiment is described by using a flowchart shown in FIG. 2.

First of all, when the electronic camera 2 shifts from the power OFF state to the power ON state, the electronic camera 2 shifts to the normal image-capture mode, and the control device 4 supplies power used in the normal image-capture mode to each unit of the electronic camera 2 and to the GPS module 22, via the power supply circuit 20. On the other hand, in the low power consumption mode, the power is supplied to each unit of the electronic camera 2 and to the GPS module 22, and if any operation signal is received from the operation unit 18, then the electronic camera 2 shifts to the normal image-capture mode, and the control device 4 supplies power used in the normal image-capture mode to each unit of the electronic camera 2 and to the GPS module 22 via the power supply circuit 20 (step S10). Here, due to the transition of the electronic camera 2 to the normal image-capture mode, the GPS module 22 shifts to the normal operation mode and starts capturing the radio wave from the GPS satellite in order to perform the process of calculating the location information.

Next, when the user performs image capture (step S11), the control device 4 stores the image data that is based on the imaging signal obtained at the time of imaging in the storage unit 11 via the image processing circuit 10 (step S12). Following this, the control device 4 acquires the location information (hereinafter, referred to as "imaging-time location information") at the time of the image capture in step S11 (at the time of imaging by the imaging sensor 6) from the GPS module 22 (step S13).

That is, when the process of calculating the location information obtained at the time of imaging is performed in real time in the GPS module 22 at the time of imaging by the imaging sensor 6, the control device 4 adds the location information at the time of imaging, as the imaging-time location information, to the image data stored in step S12 (step S14). Next, the control device 4 stores the image data to which the imaging-time location information has been added in step S14, in the recording medium 12 (step S15).

Figure 3:
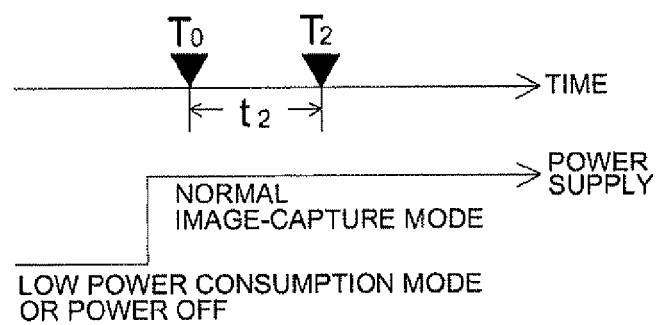
FIG. 3 is a diagram illustrating a state of a process of calculating location information in the GPS module after the imaging and a state of a power supply.

Generally, when a past history (location information calculated in the past) is not retained in the GPS module 22 (startup from power OFF: Cold start), 30 seconds or more are required to receive the radio wave from the GPS satellite and then calculate the location information; and when the past history (location information calculated in the past) is retained in the GPS module 22 (startup from the low power consumption mode which is the minimum required power consumption: Hot start), approximately five seconds are required. Therefore, at the time of imaging by the imaging sensor 6, it may not be possible to calculate the location information obtained at the time of imaging in the GPS module 22. For example, as illustrated in FIG. 3, when image capture is performed immediately (at time T0) after shifting to the normal image-capture mode from the low power consumption mode or the power OFF state, the GPS module 22 cannot calculate the location information obtained at the time of the imaging (time T0); however, the GPS module 22 can initially calculate the location information after imaging at time T2 that is established after a lapse of a fixed period t2 from the time of the imaging (time T0). In this case, the control device 4 adds (records in a manner to accompany the image data), as the imaging-time location information, the first location information calculated after the imaging, i.e., the location information calculated at time T2 (hereinafter referred to as "second location information"), to the image data. It is noted that information about date and time obtained when the location information is calculated is also included in the image-capture-time location information.

Figure 4:
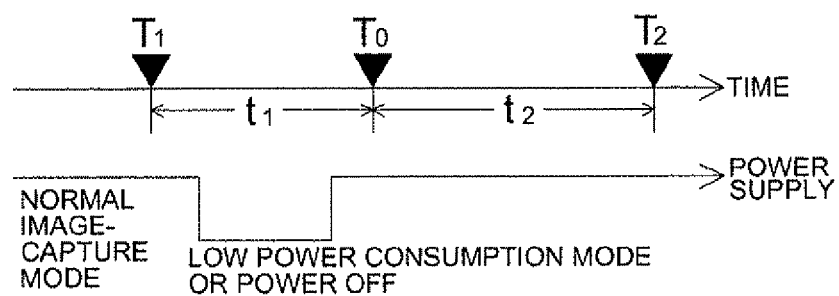
FIG. 4 is a diagram illustrating a state of the process of calculating location information in the GPS module before and after the imaging and a state of a power supply.

However, if the period t2 shown in FIG. 3 exceeds a previously defined period (predetermined period), then the second location information lacks accuracy as the imaging-time location information. Thus, for example, as shown in FIG. 4, if the GPS module 22 has calculated the location information at time T1 that is prior to the image capture performed at time T0, and if the period t1 is within the previously defined period (predetermined period), then the control device 4 may add (record in a manner to accompany the image data) the location information already calculated before the image capture, i.e., the location information calculated at time T1 (hereinafter, referred to as "first location information") to the image data, as the imaging-time location information, together with the date and time at the time of the calculation. It is noted that the location information calculated at time T1 is either information stored in the memory inside the camera or information obtained by reading (the location information and time information each added to the image data) from the image data recorded in the recording medium such as a memory card.

It is noted that the above-mentioned predetermined period depends on a displacement speed of the user, and the predetermined period is set long when the displacement speed is slow and is set short when the displacement speed is fast. For example, the following may be arranged: the predetermined period is set for each transportation means such as walking, bicycle, train, car, and airplane, and is stored in a storage device (not illustrated) inside the control device 4, which is followed by making the stored period readable according to types of transportation means being input through a user operation.

Further, together with the imaging-time location information, information indicating the method of calculating the imaging-time location information may be added to the image data as information of a mark visually recognizable on a display monitor (image display unit 16). In the embodiment, together with the imaging-time location information, if the location information for time T0 is added as the imaging-time location information, then a specific mark (for example, an "imaging-time GPS" mark) indicating the same is added to the image data as tag data, for example; if the above-mentioned first location information is added as the imaging-time location information, then a specific mark (for example, a "pre-imaging GPS" mark) indicating the same is added thereto for the same purpose; and if the above-mentioned second location information is added as the imaging-time location information, then a specific mark (for example, a "post-imaging GPS" mark) indicating the same is added thereto for the same purpose.

When the image based on the image data is displayed on the image display unit 16, if each mark is superimposed on the images and displayed, together with the imaging-time location information, as GPS information, on the image display unit 16, then the user can confirm the method of calculating the imaging-time location information, together with the imaging-time location information. As a result of understanding the calculation method, the user may prevent him/herself from being confused in various cases such as when the user arranges an image based on the GPS information added to the image data, or when the user estimates a location from the GPS information added to the image data in order to perform image capture from the same location.

According to the electronic camera 2 of the first embodiment, even if, at the time of imaging, the process of calculating the location information obtained at the time of imaging cannot be performed in the GPS module 22, the location information already calculated before the imaging or the location information calculated after the imaging is added as the imaging-time location information to the image data. Therefore, the location information at the time of imaging can be added precisely to the image data without missing the image-capture timing.

It is noted that in the electronic camera 2 according to the first embodiment, if the GPS module 22 cannot capture the radio waves during and after the imaging because the user is positioned at a place where the radio waves of the GPS satellite cannot be captured, for example, the first location information may be added to the image data as the imaging-time location information.

Next, an electronic camera according to a second embodiment of the present invention is explained with reference to drawings. The configuration of the electronic camera 2 according to the second embodiment is identical to that of the electronic camera 2 according to the first embodiment, and therefore such description will not be repeated. Further, in the electronic camera according to the second embodiment, reference numerals used in the configuration of the electronic camera 2 according to the first embodiment will be used for the description.

Figure 5:
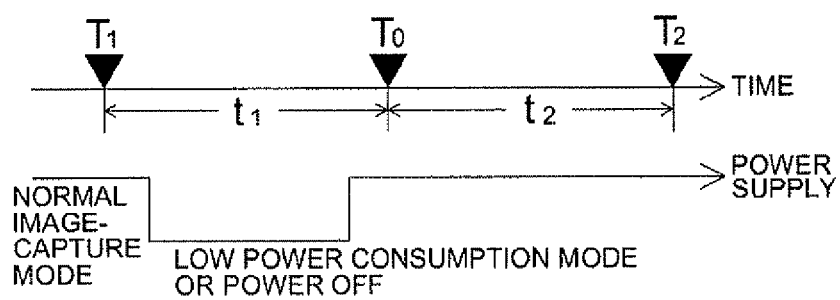
FIG. 5 is a diagram illustrating a state of the process of calculating location information in the GPS module before and after the imaging and a state of a power supply.

For example, as illustrated in FIG. 5, it is assumed that the UPS module 22 calculates the location information (the above-mentioned first location information) at time T1, which is before the time of imaging (time T0) by the period t1, and can perform calculation of the location information (the above-mentioned second location information) at time T2 after the lapse of the period t2 from the time of imaging (time T0). In this state, if both the first location information and the second location information lack accuracy as the imaging-time location information because the periods t1 and t2 shown in FIG. 5 exceed the above-mentioned predetermined period, then the control device 4 estimates the imaging-time location information based on the first location information, the second location information, and the date and time (time information) obtained when each of the location information is calculated.

Specifically, first of all, the control device 4 acquires displacement speed information that has been stored in a storage device (not illustrated) inside the control device 4. Here, as described earlier, the displacement speed information is a displacement speed of respective transportation means such as walking, bicycle, train, car, and airplane, and the displacement speed of each transportation means is stored beforehand in the storage device. In this embodiment, for example, the configuration is such that the user can selectively input the transportation means used during a time from time T1 to time T2 on the menu screen displayed on the image display unit 16 of the electronic camera 2. The control device 4 acquires the transportation means input by the user via the operation unit 18, and then, the control device 4 acquires the displacement speed information from the acquired transportation means.

Figure 6:
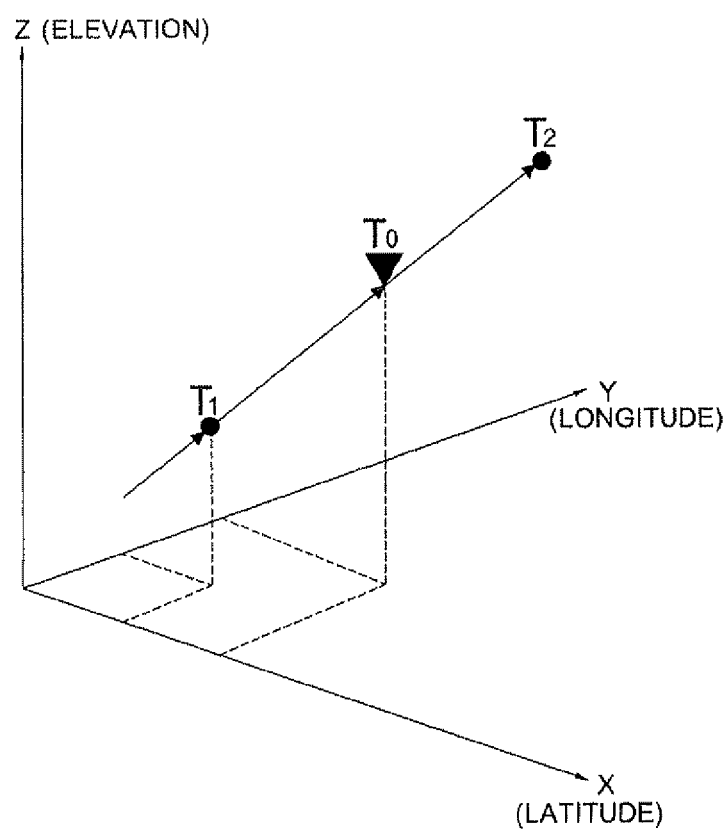
FIG. 6 is a graph illustrating locations before, during, and after the imaging, where an X axis is a latitude, a Y axis is a longitude, and a Z axis is an elevation.

Next, the control device 4 uses the acquired displacement speed information to perform estimation of the imaging-time location information based on the first location information, the second location information, and the date and time (time information) obtained when each of the location information is calculated. FIG. 6 is a graph illustrating locations at times T1 and T2 and a location at time T0 as estimated from the locations at times T1 and T2, where an X axis is a latitude, a Y axis is a longitude, and a Z axis is an elevation. As illustrated in FIG. 6, from the location information, such as a latitude, a longitude, and an elevation, included in the first location information and the time T1 that is the calculated date and time, and the location information, such as a latitude, a longitude, and an elevation, included in the second location information and the time T2 that is the calculated date and time, a movement distance between the time T1 and the time T2, a movement path therebetween or the like is estimated, and as a result of the calculation operation, location information such as a latitude, a longitude, and an elevation at time T0 (at the time of imaging) is estimated.

It is noted that if a high-speed train or an airplane is used as the transportation means, for example, the estimated location at time T0 lacks accuracy if the periods t1 and t2 illustrated in FIG. 5 exceed one to two hours. However, if walking is used as the transportation means, then it cannot be said that the estimated location at time T0 lacks accuracy even if the periods t1 and t2 exceed one to two hours. Therefore, an upper limit may be set to the periods t1 and t2 for each displacement speed information, and if the upper limit is exceeded, then it can be determined that the imaging-time location information obtained by the estimation lacks accuracy, and then the calculation operation may be stopped.

The control device 4 adds the location information obtained by the estimation as the imaging-time location information to the image data (records in association with the image data), and stores the image data to which the imaging-time location information has been added, in the recording medium 12. It is noted that if the configuration is such that information added by the control device 4 to the image data also includes information indicating that the imaging-time location information, which has been added to the image data, is the location information calculated by the estimation, then identification is facilitated in the event that the user subsequently arranges the image data. Furthermore, similar to the first embodiment, the information showing the method of calculating the imaging-time location information (for example, an "estimated GPS" mark) may be added, together with the imaging-time location information, to the image data, as the tag data, for example.

According to the electronic camera of the second embodiment, even if the process of calculating the location information at the time of imaging cannot be performed in the GPS module 22 at the time of imaging, the location information obtained by the estimation based on the location information already calculated before the imaging, the location information calculated after the imaging, and the time information obtained when each of the location information is calculated is added to the image data as the imaging-time location information. Therefore, the location information at the time of imaging can be added precisely to the image data without missing the image-capture timing.

Furthermore, according to the electronic camera of each of the above embodiments, when the electronic camera shifts from the low power consumption mode or the power OFF state, to the normal image-capture mode, the GPS module operates in conjunction with the electronic camera and shifts from the low power consumption mode or the power OFF state to the normal operation mode in which the process of calculating the location information is executed. That is, since the power supply circuit of the electronic camera controls the power of the GPS module, the GPS module also switches to the low power consumption mode when the electronic camera switches to the low power consumption mode. Therefore, the power consumption of the electronic camera can be suppressed.

It is noted that in the second embodiment, the location information obtained by the estimation based on the location information items calculated before and after the imaging, and the time information obtained when each of the location information is calculated is added as the imaging-time location information (hereinafter, referred to as "post-imaging estimated location information") to the image data; however, the location information obtained by the estimation based on the two location information items already calculated before the imaging and the time information obtained when each of the location information is calculated (hereinafter, referred to as "pre-imaging estimated location information") may be added, as the imaging-time location information, to the image data. It is noted that upon calculation of the pre-imaging estimated location information, the location information items obtained at least two different time points and the time information obtained when each of the location information is calculated are either saved in the memory inside the camera or used by reading (the location information and the time information each added to the image data) from the image data recorded in the recording medium such as a memory card.

Figure 7:
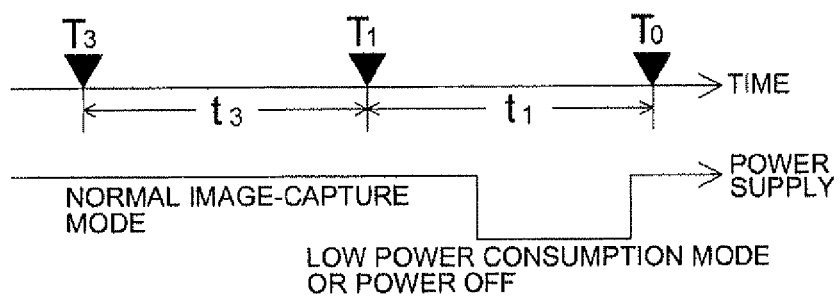
FIG. 7 is a diagram illustrating a state of the process of calculating location information in the GPS module before the image capture and a state of a power supply.
Figure 8:
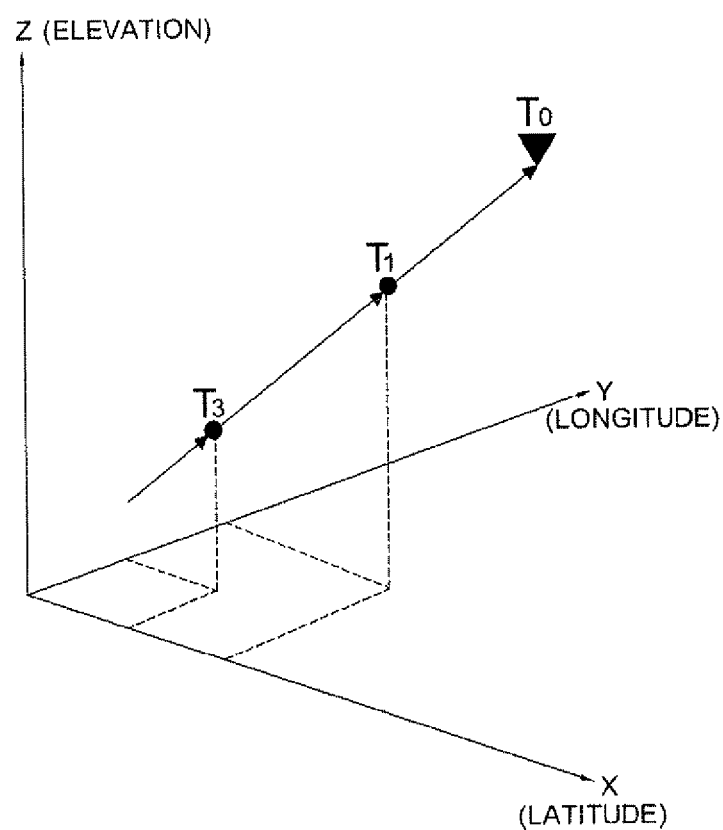
FIG. 8 is a graph illustrating locations before and during the imaging, where an X axis is a latitude, a Y axis is a longitude, and a Z axis is an elevation.

For example, as shown in FIG. 7, it is assumed that the GPS module 22 calculates the location information (the first location information) at time T1, which is before the time of imaging (time T0) by the period t1, and also performs the process of calculating the location information (hereinafter referred to as "third location information") at time T3, which is before the time of imaging (time T0) by a period (t1+t3). The control device 4 acquires the displacement speed information and uses the acquired displacement speed information so as to perform an estimation of the imaging-time location information based on the first location information, the third location information, and the date and time (time information) obtained when each of the location information is calculated. FIG. 8 is a graph illustrating locations at times T1 and T3 and a location at time T0 as estimated from the locations at times T1 and T3, where an X axis is a latitude, a Y axis is a longitude, and a Z axis is an elevation. As illustrated in FIG. 8, from the location information, such as a latitude, a longitude, and an elevation, included in the first location information and the time T1 that is the calculated date and time, and the location information, such as a latitude, a longitude, and an elevation, included in the third location information and the time T3 that is the calculated date and time, a movement distance between the time T3 and the time T0, a movement path therebetween or the like is estimated, and as a result of the calculation operation, location information such as a latitude, a longitude, and an elevation at time T0 (at the time of imaging) is estimated. It is noted that in this case also, the configuration is such that the control device 4 adds the information indicating that the image-capture-time location information, which has been added to the image data, is the location information calculated by the estimation, to the image data.

Furthermore, the post-imaging estimated location information and the pre-imaging estimated location information may be compared to select the more accurate location information, and the selected information may be added, as the imaging-time location information, to the image data.

Further, in the electronic camera according to the second embodiment, the location information obtained by estimation based on two location information items calculated before and after the imaging and the time information obtained when each of the location information is calculated is added, as the imaging-time location information, to the image data, however, location information obtained by estimation based on three or more location information items calculated before and after the imaging and the time information obtained when each of the location information is calculated may also be added, as the imaging-time location information, to the image data.

Further, the methods of calculating the imaging-time location information according to the first and second embodiments may be combined to select the most accurate location information, and the selected information may be added, as the imaging-time location information, to the image data.

Also, the estimation technique in the above-mentioned second embodiment can also be applied in situations such as the following. For example, as illustrated in FIG. 5, in the case where although the GPS module 22 is calculating the location information (the above-mentioned first location information) at time T1, which is before the time of imaging (time T0) by the period t1, the calculation at the time of image capture (time T0) is not finished in time, and the power supply of the camera is turned OFF (that is, the GPS module 22 is also turned OFF) at a time point before the time T2 (between the time T0 and time T2) (that is, in the case where the location information at the time T2 (the above-mentioned second location information) cannot be calculated), the location at time T0 may be estimated from the location information that is already acquired in the past (locations at times T1 and T3 shown in FIG. 7), as shown in the above-mentioned second embodiment. It is noted that in such a case, the number of hours of retrospective location information that can be used in the estimation (retrospective permitted time) may be set beforehand, and if the location information for the retrospective permitted time cannot be acquired, then the estimation of the location information at time T0 is prohibited, and at the same time, this effect (that the location information cannot be acquired) may be added to the image data.

Furthermore, in the electronic camera according to each of the above embodiments, the detachable GPS module 22 is provided; however, the configuration may be such that the GPS module is built inside the electronic camera.

Moreover, in the electronic camera according to each of the above embodiments, the GPS module 22 performs the process of calculating the location information at each predetermined timing only during the normal operation mode and does not perform the process of calculating the location information during the low power consumption mode; however, the GPS module 22 may be shifted to the normal operation mode at each predetermined timing to perform the process of calculating the location information.

What is claimed is:

1. An imaging apparatus, comprising:
   an imaging unit including an imaging sensor for imaging light from an object and a storage unit for storing image data generated based on an imaging signal output from the imaging sensor; and
   a GPS module for executing a process of calculating location information based on received data from a satellite, wherein:
   as a result of the imaging unit shifting from a low power consumption mode or a power OFF state to a normal image-capture mode, the GPS module shifts from the low power consumption mode or the power OFF state to a normal operation mode in which the process of calculating the location information is executed;
   if it is not possible to perform the process of calculating the location information at the time of imaging the light from an object in the GPS module at a time point at which the light from an object is imaged after the imaging unit has been shifted to the normal image-capture mode, then imaging-time location information obtained in consideration of at least one of pre-image-capture location information already acquired at a time point before the time of the imaging and post-image-capture location information calculated at a time point after the time of the imaging is added to the image data and stored in the storage unit, and calculation technique information indicating by which technique the image-capture-time location information has been obtained is also added to the image data and stored in the storage unit;
   the imaging-time location information is location information obtained by estimation based on time information at the time of imaging the light from an object, at least two location information items calculated in the GPS module before imaging the light from an object and time information obtained when each of the location information is calculated; and
   the calculation technique information is information for specifying whether or not the image-capture-time location information is the location information acquired by the estimation.

2. The imaging apparatus according to claim 1, wherein the imaging-time location information is obtained in consideration of both the pre-imaging location information and the post-imaging location information.

3. The imaging apparatus according to claim 1, wherein the calculation technique information is information specifying whether the image-capture-time location information is location information that is acquired at the time point of imaging, or location information that is already acquired at a time point before imaging, or location information that is calculated at a time point after imaging.

4. An imaging apparatus, comprising:
   an imaging unit including an imaging sensor for imaging light from an object and a storage unit for storing image data generated based on an imaging signal output from the imaging sensor; and
   a GPS module for executing a process of calculating location information based on received data from a satellite, wherein:
   as a result of the imaging unit shifting from a low power consumption mode or a power OFF state to a normal image-capture mode, the GPS module shifts from the low power consumption mode or the power OFF state to a normal operation mode in which the process of calculating the location information is executed;
   if it is not possible to perform the process of calculating the location information at the time of imaging the light from an object in the GPS module at a time point at which the light from an object is imaged after the imaging unit has been shifted to the normal image-capture mode, then imaging-time location information obtained in consideration of at least one of pre-image-capture location information already acquired at a time point before the time of the imaging and post-image-capture location information calculated at a time point after the time of the imaging is added to the image data and stored in the storage unit, and calculation technique information indicating by which technique the image-capture-time location information has been obtained is also added to the image data and stored in the storage unit;
   the imaging-time location information is location information estimated based on time information obtained at the time of imaging the light from an object, location information calculated before imaging the light from an object in the GPS module, location information calculated after imaging the light from an object, and time information obtained when each of the location information is calculated; and
   the calculation technique information is information for specifying whether or not the image-capture-time location information is the location information acquired by the estimation.

5. The imaging apparatus according to claim 4, wherein the imaging-time location information is obtained in consideration of both the pre-imaging location information and the post-imaging location information.

6. The imaging apparatus according to claim 4, wherein the calculation technique information is information specifying whether the image-capture-time location information is location information that is acquired at the time point of imaging, or location information that is already acquired at a time point before imaging, or location information that is calculated at a time point after imaging.

7. The imaging apparatus according to claim 1, further comprising a display unit capable of displaying the image-capture-time location information, wherein the calculation technique information, together with the image-capture-time location information, is displayed on the display unit.

8. The imaging apparatus according to claim 4, further comprising a display unit capable of displaying the image-capture-time location information, wherein the calculation technique information, together with the image-capture-time location information, is displayed on the display unit.

9. An imaging apparatus, comprising:
an imaging unit including an imaging sensor for imaging light from an object and a storage unit for storing image data generated based on an imaging signal output from the imaging sensor; and
a GPS module for executing a process of calculating location information based on received data from a satellite, wherein:
as a result of the imaging unit shifting from a low power consumption mode or a power OFF state to a normal image-capture mode, the GPS module shifts from the low power consumption mode or the power OFF state to a normal operation mode in which the process of calculating the location information is executed;
if it is not possible to perform the process of calculating the location information at the time of imaging the light from an object in the GPS module at a time point at which the light from an object is imaged after the imaging unit has been shifted to the normal image-capture mode, then imaging-time location information obtained in consideration of at least one of pre-image-capture location information already acquired at a time point before the time of the imaging and post-image-capture location information calculated at a time point after the time of the imaging is added to the image data and stored in the storage unit, and calculation technique information indicating by which technique the image-capture-time location information has been obtained is also added to the image data and stored in the storage unit;
the calculation technique information is information specifying whether the image-capture-time location information is location information that is acquired at the time point of imaging, or location information that is already acquired at a time point before imaging, or location information that is calculated at a time point after imaging, the imaging apparatus further comprises a display unit capable of displaying the image-capture-time location information; and
the calculation technique information, together with the image-capture-time location information, is displayed on the display unit.

10. The imaging apparatus according to claim 9, wherein an image acquired at the time of image capture, together with the calculation technique information, is displayed on the display unit.

* * * * *